United States Patent Office 3,838,097
Patented Sept. 24, 1974

3,838,097
PROCESS FOR MAKING POLYETHERIMIDES AND PRODUCTS DERIVED THEREFROM
Joseph G. Wirth and Darrell R. Heath, Schenectady, N.Y., assignors to General Electric Company
No Drawing. Filed Sept. 1, 1971, Ser. No. 177,164
Int. Cl. C08g 20/32
U.S. Cl. 260—49
39 Claims

ABSTRACT OF THE DISCLOSURE

Polyetherimides are prepared from the reaction of a bis(nitrophthalimide) with an alkali metal salt of a divalent carbocyclic aromatic radical in the presence of an appropriate solvent. The invention also covers the novel polyetherimides prepared in accordance with the above-described process.

---

Recent interest in heat-resistant polymers has led to the development of polyimides. These polymers incorporate the imide group in the polymer main chain and are prepared from aromatic acids. Such aromatic polyimides are useful in making films, moldings and wire enamels. A comprehensive review of polyimides including their preparation, properties and applications is set forth in the *Encyclopedia of Polymer Science and Technology*, Vol. 11, pages 247–272 (1969). The reference discloses the preparation of polyimides from aliphatic diamines and aromatic tetracarboxylic acids or from aromatic diamines and aromatic dianhydrides.

In our copending application Ser. No. 177,166 filed even date herewith, we have disclosed a new class of versatile monomers designated as bis(nitrophthalimides) and a process for making these monomers. Quite surprisingly we have now discovered that we can prepare polyetherimides by copolymerizing bis(nitrophthalimides) with a divalent carbocyclic aromatic radical. The polyetherimides formed by our novel process are useful in making films, moldings and wire enamels having heat resistant properties.

In accordance with the present invention, we have broadly discovered a novel class of polyetherimides having the general formula:

(I) 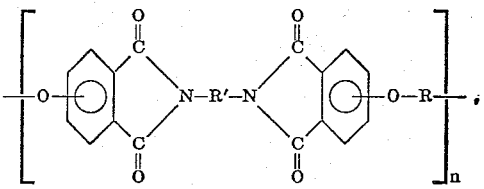

wherein —O—Z< is defined as a member selected from the group consisting of (a) 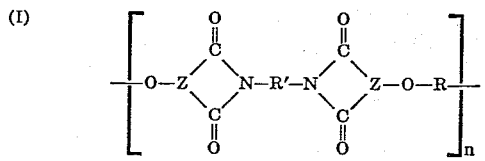

wherein R″ can be hydrogen, lower alkyl or lower alkoxy, (b) 

and (c) 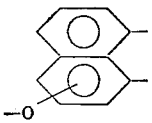

wherein the oxygen may be attached to either ring and located ortho or para to one of the bonds to the anhydride carbonyl groups; and R, R′ and n are defined hereinbelow, said polyetherimides being terminated by a group represented by =Z—NO$_2$ or a phenolic group, wherein Z is defined hereinabove.

A preferred family of the generic group are polyetherimides having the formula:

(II) 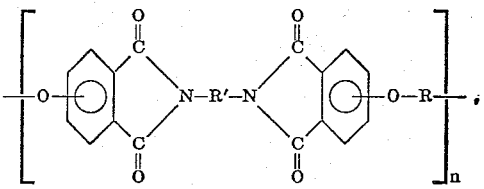

wherein R is a divalent aromatic radical containing from 6–20 carbon atoms, R′ is a divalent radical which is the organic residue of a diamine reacted with a nitro-substituted aromatic anhydride, and n is an integer having a value greater than 1, for instance, from 2 to as high as 5,000 or more. More specifically, R can be a member selected from the group consisting of phenylene, lower alkylphenylene,

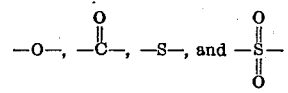, and wherein X is a member selected from the group consisting of bivalent aliphatic, cycloaliphatic or araliphatic (having 1–8 carbon atoms), $$-O-,\ -\overset{O}{\underset{}{C}}-,\ -S-, \text{ and } -\overset{O}{\underset{O}{S}}-$$

and R′ is a member selected from the group consisting of R, xylylene, alkylene containing 2–18 carbon atoms and cycloalkylene, said polyetherimides being terminated by a group represented by

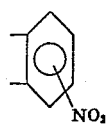

or a phenolic group.

Our invention also relates to a process, as illustrated by the preferred family of the generic group, which comprises effecting reaction in the presence of a dipolar aprotic solvent of a mixture of ingredients comprising (1) a bis (nitrophthalimide) of the general formula:

(III) 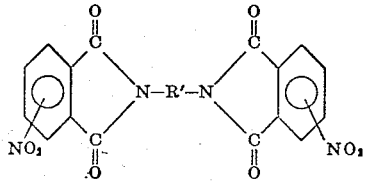

wherein R′ is defined as hereinabove, and (2) an alkali metal salt of an organic compound of the general formula:

(IV) 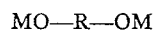

MO—R—OM wherein M is an alkali metal and R is defined as hereinabove.

The bis(nitrophthalimide) used in preparing the polymer is formed by reacting a diamine of the formula:

(V)          NH₂—R′—NH₂ wherein R′ is defined as hereinabove with a nitro-substituted aromatic anhydride of the formula:

(VI)

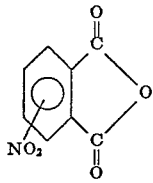

The molar ratio of diamine to anhydride should ideally be about 1:2 respectively. The initial reaction product is a bis(amide-acid) which is subsequently dehydrated to the corresponding bis(nitrophthalimide).

The diamines of formula V above are described in the prior art and are to a large extent commercially available materials. Typical of such diamines from which the bis(nitrophthalimides) may be prepared are the following:

m-phenylenediamine;
p-phenylenediamine;
4,4′-diaminodiphenylpropane;
4,4′-diaminodiphenylmethane;
benzidine;
4,4′-diaminodiphenyl sulfide;
4,4′-diaminodiphenyl sulfone;
4,4′-diaminodiphenyl ether;
1,5-diaminonaphthalene;
3,3′-dimethylbenzidine;
3,3′-dimethoxybenzidine;
2,4-bis(β-amino-t-butyl)toluene;
bis(p-β-amino-t-butylphenyl)ether;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
bis(4-aminocyclohexyl)methane;
decamethylenediamine;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;

and mixtures thereof. It should be noted that these diamines are given merely for the purpose of illustration and are not considered to be all inclusive. Other diamines not mentioned will readily be apparent to those skilled in the art.

The preferred nitrophthalic anhydrides useful in the present invention are 3-nitrophthalic anhydride, 4-nitrophthalic anhydride and mixtures thereof. These reactants are commercially available in reagent grade. They may also be prepared by the nitration of phthalic anhydride using procedures described in *Organic Syntheses*, Collective Vol. I, Wiley (1948), page 408. Certain other closely related nitroaromatic anhydrides may also be used in the reaction and are illustrated for example by 2-nitronaphthalic anhydride, 4-nitronaphthalic anhydride, 1-nitro-2,3-naphthalenedicarboxylic anhydride and 3-methoxy-6-nitrophthalic anhydride.

With reference to the alkali metal salts of formula IV, among the divalent carbocyclic aromatic radicals which R may represent (mixtures of such radicals are also included) are, for instance, divalent aromatic hydrocarbon radicals of from 6 to 20 carbon atoms, such as phenylene, biphenylene, naphthylene, etc. Included are residues of, e.g., hydroquinone, resorcinol, chlorohydroquinone, etc. In addition, R may be a residue of a dihydroxy diarylene compound in which the aryl nuclei are joined by either an aliphatic group, a sulfoxide group, sulfonyl group, sulfur, carbonyl group, oxygen, the —C(CH₃)(CH₂)₂(COOH) group, etc. Typical of such diarylene compounds are the following:

2,4′-dihydroxydiphenylmethane;
bis(2-hydroxyphenyl)methane;
2,2-bis(4-hydroxyphenyl)propane hereinafter identified as "Bisphenol-A" or "BPA";
bis(4-hydroxyphenly)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,2-bis(4-hydroxyphenyl)ethane;
1,1-bis(4-hydroxy-2-chlorophenyl)ethane;
1,1-bis(2,5-dimethyl-4-hydroxyphenyl)ethane;
1,3-bis(3-methyl-4-hydroxyphenyl)propane;
2,2-bis(3-phenyl-4-hydroxyphenyl)propane;
2,2-bis(3-isopropyl-4-hydroxyphenyl)propane;
2,2-bis(4-hydroxynaphthyl)propane;
2,2-bis(4-hydroxyphenyl)pentane;
3,3-bis(4-hydroxyphenyl)pentane;
2,2-bis(4-hydroxyphenyl)heptane;
bis(4-hydroxyphenyl)phenylmethane;
bis(4-hydroxyphenyl)-cyclohexylmethane;
1,2-bis(4-hydroxyphenyl)-1,2-bis(phenyl)propane;
2,2-bis(4-hydroxyphenyl)-1-phenylpropane;
2,4-dihydroxybenzophenone;
4,4′-dihydroxydiphenyl sulfone;
2,4′-dihydroxydiphenyl sulfone;
5′-chloro-2,4′-dihydroxydiphenyl sulfone;
3′-chloro-4,4′-dihydroxydiphenyl sulfone;
4,4′-dihydroxytriphenyl disulfone;
4,4′-dihydroxydiphenyl ether;
4,4′-dihydroxydiphenyl sulfide;
4,4′-dihydroxy-o-biphenyl ether;
the 4,3′-, 4,2′-, 4,1′-, 2,2′-, 2,3′-, etc. dihydroxydiphenyl ethers;
4,4′-dihydroxybenzophenone;
4,4′-dihydroxy-2,6-dimethyldiphenyl ether;
4,4′-dihydroxy2,5-dimethyldiphenyl ether;
4,4′-dihydroxy-3,3′-diisobutyldiphenyl ether;
2-methyl-2-carboxyethyl-bis(4-hydroxyphenyl)propane;
4,4′-dihydroxy-3,3′-diisopropyldiphenyl ether;
4,4′-dihydroxy-3,2′-dinitrodiphenyl ether;
4,4′-dihydroxy-3,3′-dichlorodiphenyl ether;
4,4′-dihydroxy-3,3′-difluorodiphenyl ether;
4,4′-dihydroxy-2,3′-dibromodiphenyl ether;
4,4′-dihydroxydinaphthyl ether;
4,4′-dihydroxy-3,3′-dichlorodinaphthyl ether;
2,4-dihydroxytetraphenyl ether;
4,4′-dihydroxypentaphenyl ether;
4,4′-dihydroxy-2,6-dimethoxydiphenyl ether;
4,4′-dihydroxy-2,5-diethoxy-diphenyl ether;

etc., dihydric phenols substituted on the aryl nucleus with alkyl, alkenyl, cycloaliphatic, cycloalkenyl, aryl, alkaryl, numerous examples of which have been given above, as well as the dihydroxy toluenes, the dihydroxy xylenes, dihydroxy pyridines, dihydroxy anthraquinones, dihydroxy benzoic acids, other dihydroxy benzophenones, etc.

The R radical can have many inert substituents on the aryl nuclei as recited above, for instance, monovalent hydrocarbon radicals such as methyl, ethyl, cycloaliphatic radicals (for instance, cyclopentyl, cyclohexyl etc.), etc.; aryl radicals, e.g., phenyl, biphenyl, etc., radicals; alkaryl radicals, e.g., tolyl, ethylphenyl, etc., radicals, aralkyl radicals, e.g., benzyl, phenylethyl, etc., radicals.

The means whereby the process of the present invention may be practiced and polymeric compositions herein defined obtained can be varied widely. When dialkali metal salts of formula IV are used with the compound illustrated by formula III, the ingredients are advantageously present in an equal molar ratio for optimum molecular weight and properties of the polymer. Slight molar excesses, e.g., about 0.001 to 0.01 molar excess of either the dinitro-substituted organic compound or of the dialkali metal salt of formula IV may be employed without departing from the scope of the invention for molecular weight control. When the molar ratios are approximately equal, the polymer is substantially terminated by a $=Z-NO_2$ at one end and a phenolic group at the other end. If there is a molar excess of one compound, that particular terminal group will predominate.

In making the alkali-metal salts of formula IV, it is sometimes advantageous to preform these salts by reacting the corresponding dihydroxy organic compound with an alkali-metal hydroxide such as sodium hydroxide, potassium hydroxide, etc. For instance, the dialkali metal salt of Bisphenol A may be obtained by reacting 2 moles of sodium hydroxide per mole of Bisphenol A. On the other hand, the alkali metal salt of formula IV may be formed in situ, by adding the dihydroxy organic compound and an alkali metal carbonate directly to a solution or suspension of the bis-nitroimide of formula III. Persons skilled in the art will have no difficulty in determining how to make the alkali-metal salts of formula IV for use with the dinitro-substituted organic compound of formula III.

The conditions of reaction whereby the alkali-metal salt of formula IV is reacted with the dinitro-substituted organic compound of formula III can be varied widely. Generally, temperatures of the order of about 25–150° C. are advantageously employed, although it is possible to employ lower or higher temperature conditions depending on the ingredients used, the reaction product sought, time of reaction, solvent employed, etc. In addition to atmospheric pressure, superatmospheric pressures and subatmospheric pressures may be employed depending upon the other conditions of reaction, the ingredients used, the speed at which it is desired to effect reaction, etc.

The time of reaction also can be varied widely depending on the ingredients used, the temperature, the desired yield, etc. It has been found that times varying from about 5 minutes to as much as 30 to 40 hours are advantageously employed to obtain the maximum yield. Thereafter the reaction product can be treated in the manner required to effect precipitation and/or separation of the desired polymeric reaction product. Generally, common solvents such as alcohols (e.g. methanol, ethanol, isopropyl alcohol, etc.) and aliphatic hydrocarbons (e.g. pentane, hexane, octane, cyclohexane, etc.) may be employed for the purpose.

It is important that the reaction between the dinitro-substituted organic compound of formula III and the alkali-metal salt of formula IV (mixtures of such alkali-metal salts can also be used) be carried out in the presence of a dipolar aprotic solvent. The term "dipolar aprotic solvent" is intended to mean any organic solvent which has no active protons which may interfere with the reaction herein described. Also, mixtures of dipolar aprotic solvents with other inert organic solvents, such as benzene, toluene, xylene and methylenechloride may be used. These cosolvents offer the advantage that they may act as preferential solvents for the polymer produced.

Among the preferred aprotic solvents which may be employed in the practice of this invention are non-acid, oxygen-containing, nitrogen-containing organic solvents. These include but are not limited to, for instance, N,N-dimethylacetamide, N-methylpyrrolidone, N,N-dimethylformamide, dimethylsulfoxide, hexamethylphosphoramide, etc.

The amount of solvent used in the reaction mixture may be varied widely. Generally, on a weight basis, one can employ from 0.5 to 50 or more parts of the solvent per part of total weight of the reactants, namely, the dinitro-substituted organic compound of formula III and the alkali-metal salt of formula IV. The amount of solvent is not critical, but generally we have found that on a weight basis one can employ from 2 to 20 parts of the solvent per part of the total weight of the dinitro-substituted organic compound and the alkali-metal salt, whether the latter is preformed or prepared in situ.

Thus, as an illustration, the dianion of a bisphenol is prepared and maintained in a nitrogen atmosphere using an alkali metal hydroxide (1.000 mole bisphenol to 2.000 moles hydroxide) as an aqueous solution. Water is then removed by azeotropic distillation with an appropriate solvent, e.g. benzene. The polymerization is performed under anhydrous conditions usually using dipolar aprotic solvents such as dimethylsulfoxide which are added in varying amounts depending upon the particular polymerization. A total quantity of solvent, dipolar aprotic solvent or mixture of such solvent with an aromatic solvent sufficient to give a final solution containing 10–20% by weight of polymer is preferably employed.

When the dianion is completely anhydrous, the bisnitrophthalimide is added with stirring and polymerization takes place. After reaction at a sufficient temperature and for a sufficient time, the polymer solution is allowed to cool to room temperature and a few drops of acetic acid are added to discharge the residual color. The polymer is isolated by precipitating in methanol, washing in methanol, filtering and drying in a vacuum oven to give a yield of 80–100%.

In order that those skilled in the art may better understand how the present invention may be practiced, the following examples are given by way of illustration and not by way of limitation. Unless otherwise stated, all parts are by weight.

EXAMPLE I

A mixture of 2.2828 g. (0.010 mole) of Bisphenol A, 0.8 g. (1.5904 g. 50.3% aqueous solution, 0.02 mole) sodium hydroxide, 20 ml. dimethylsulfoxide, and 6 ml. benzene was stirred in a nitrogen atmosphere at reflux over a Dean Stark trap for 6 hours and the benzene was distilled. The mixture was cooled to 40° C. and 5.845 g. (0.010 mole) 4,4'-bis(3-nitrophthalimido)diphenylmethane and 30 ml. dry dimethyl sulfoxide were added. After 40 min. reaction at 40° C., the reaction was quenched by adding 0.2 ml. glacial acetic acid and the mixture was added to 600 ml. methanol.

The product, which separated as a fine white granular solid, was isolated by filtration, washed with water and methanol and dried "in vacuo" at 60° C. to give 6.8 g. (100% yield) of polymer. The crude product was dissolved in methylene chloride and precipitated from methanol to give 6.2 g. of off-white polymer. I.V. ($CH_2Cl_2$) 0.28; $T_g$, 230° C.; TGA (air) 380° C.

Analysis.—Calculated for $(C_{44}H_{30}N_2O_6)_n$: C, 77.4; H, 4.4; N, 4.0. Found: C, 77.1; H, 4.6; N, 4.6.

EXAMPLE II

A mixture of 2.2828 g. (0.010 mole) Bisphenol A, 0.8 g. (1.59 g. of 50.3% aqueous solution) sodium hydroxide, 20 ml. dimethylsulfoxide, and 20 ml. benzene was stirred in a nitrogen atmosphere at reflux over a Dean-Stark trap for 5 hours and the benzene was removed by distillation. The mixture was cooled to 50° C. and 5.5042 g. (0.010 mole) 4,4'-bis(3-nitrophthalimido) diphenylether and 30 ml. DMSO were added. The mixture was stirred at 80° C.±5° C. for 30 minutes, cooled, and then added to 500 ml. methanol.

The precipitate which separated from methanol was isolated by filtration, washed with methanol and water and dried "in vacuo" at 110° C. to give 6.8 g. (99.5% yield) of crude polymers. I.V. (DMF), 0.26; $T_g$, 226° C.; TGA (air), 385° C.

*Analysis.*—Calculated for $(C_{43}H_{28}N_2O_7)_n$: C, 75.4; H, 4.1; N, 4.1. Found: C, 74.9; H, 4.3; N, 4.7.

EXAMPLE III

A mixture of 2.2828 g. (0.010 mole) Bisphenol A, 0.8 g. (1.59 g. of 50.3% aqueous solution, 0.02 mole) sodium hydroxide, 20 ml. of dimethyl sulfoxide, and 10 ml. benzene was stirred in a nitrogen atmosphere at reflux over a Dean Stark trap for 5 hours and the benzene was removed by distillation. The mixture was cooled to 40° C. and 4.6640 g. (0.010 mole) 1,6-bis(3-nitrophthalimido)hexane and 30 ml. dimethylsulfoxide were added. Within minutes, a resinous material separated. After 30 min. reaction at 50° C., a fine stream of chloromethane was bubbled through the solution followed by the addition of 2 ml. glacial acetic acid.

The mixture was cooled, added to 600 ml. methanol and the solids, isolated by filtration, were dried "in vacuo" at 110° C. to give 5.3 g. (88.4%) of crude product. The polymer was dissolved in methylene chloride, filtered and precipitated from methanol to give 4.6 g. of white solid. I.V. ($CH_2Cl_2$), 0.40; $T_g$, 135° C.; TGA (air) 385° C.

*Analysis.*—Calculated for $(C_{37}H_{32}N_2O_6)_n$: C, 74.1; H, 5.3; N, 4.7. Found: C, 73.3; H, 5.1; N, 5.2.

EXAMPLE IV

A mixture of 2.2828 g. (0.01 mole) Bisphenol A, 0.8 g. (1.5904 g. 50.3% aqueous solution, 0.02 mole) sodium hydroxide, 20 ml. dimethyl sulfoxide, and 15 ml. benzene was stirred in a nitrogen atmosphere at reflux over a Dean Stark trap for 4 hours and the benzene was distilled. The mixture was cooled to 40° C. and stirred vigorously while 4.1029 g. (0.01 mole) 1,2-bis(3-nitrophthalimido) ethane and 30 ml. dry dimethyl sulfoxide were added. The reaction temperature was raised to 100° C. over 25 minutes and after 15 minutes reaction at 100° C., the solution was cooled to room temperature and neutralized with glacial acetic acid.

The mixture was added to methanol and the crude polymer, which separated as a fine white powder, was isolated by filtration, washed with methanol, and dried "in vacuo" at 110° C. to give 4.8 g. (88.5% yield) of product. The crude polymer was dissolved in methylene chloride, filtered and reprecipitated from methanol to give 3.4 g. of white powder. I.V. ($CH_2Cl_2$) 0.10; $T_g$, 180° C.; TGA (air) 388° C.

*Analysis.*—Calculated for $(C_{33}H_{24}H_2O_6)_n$: C, 72.8; H, 4.4; N, 5.2. Found: C, 72.0; H, 4.6; N, 5.7.

EXAMPLE V

A mixture of 2.2828 g. (0.01 mole) Bisphenol A, 0.8 g. 50.3% aqueous solution (0.02 mole) sodium hydroxide, 20 ml. dimethylsulfoxide, and 8 ml. benzene was stirred in a nitrogen atmosphere at reflux over a Dean-Stark trap for 4 hours and the benzene was distilled. The mixture was cooled to room temperature and stirred while 5.9842 g. (0.01 mole) 4,4'-bis(3-nitrophthalimido) diphenylsulfone and 30 ml. dry dimethylsulfoxide were added. The mixture was stirred at 40° C. for 30 minutes and then treated with chloromethane and finally glacial acetic acid. The reaction mixture was added to methanol, and the polymer isolated by filtration, washed with methanol and dried "in vacuo" at 110° C. to give 7.3 g. (79.5%) of tan powder. The crude product was dissolved in methylene chloride, filtered and reprecipitated in methanol to give a light yellow polymer. I.V. (DMF) 0.13; $T_g$ (no transitions); TGA (air) 370° C.

*Analysis.*—Calculated for $(C_{43}H_{28}N_2O_8S)_n$: C, 70.5; H, 3.8; S, 4.4. Found: C, 67.8; H, 3.8; N, 4.5; S, 4.3.

EXAMPLE VI

A mixture of 2.0221 g. (0.01 mole) 4,4'-dihydroxydiphenylether, 0.8 g. (1.5904 g. 50.3% aqueous solution, 0.02 mole) sodium hydroxide, 20 ml. dimethylsulfoxide and 7 ml. benzene was stirred in a nitrogen atmosphere at reflux over a Dean-Stark trap for 4 hours and the benzene was distilled until the solution was homogeneous. The mixture was cooled to 40 °C. and stirred while 5.5042 g. (0.01 mole) 4,4'-bis(3-nitrophthalimido)diphenylether and 40 ml. dry dimethylsulfoxide were added.

After stirring at 40° C. for 15 minutes, the reaction was quenched by addition of 2 ml. glacial acetic acid and the polymer was precipitated by addition to methanol. The crude product (off-white granules) was isolated by filtration, washed with methanol, and dried "in vacuo" at 110° C. to give 6.5 g. (99% yield) of polymer. This material was dissolved in methylene chloride, filtered and reprecipitated in methanol to give a white powder. I.V. ($CH_2Cl_2$) 0.36; $T_g$ (no transitions); TGA (air) 400° C.

*Analysis.*—Calculated for $(C_{40}H_{22}N_2O_8)_n$: C, 73.0; H, 3.3; N, 4.3. Found: C, 72.0; H, 3.4; N, 4.9.

EXAMPLE VII

A mixture of 2.0221 g. (0.01 mole) 4,4'-dihydroxydiphenylether, 0.8 g. (1.5904 g. of 50.3% aqueous solution, 0.02 mole) sodium hydroxide, 20 ml. dimethylsulfoxide, and 7 ml. benzene was stirred in a nitrogen atmosphere at reflux over a Dean-Stark trap for 4 hours and the benzene was distilled. The mixture was cooled to 40° C. and stirred while 4.4664 g. (0.01 mole) 1,6-bis(3-nitrophthalimido) hexane and 30 ml. dimethylsulfoxide were added. After 45 minutes stirring at 40° C., the reaction was quenched by adding 2 ml. of glacial acetic acid and the mixture was added to methanol.

The product (off-white granules) was isolated by filtration and dried "in vacuo" at 110° C. to give 5.6 g. (97.7% yield) of polymer. The crude product was dissolved in methylene chloride, filtered and precipitated in methanol to give 4.0 g. of pure polymer. I.V. ($CH_2Cl_2$) 0.29; $T_g$ 128° C.; TGA (air) 330° C.

*Analysis.*—Calculated for $(C_{34}H_{28}N_2O_7)_n$: C, 71.1; H, 4.5; N, 4.9. Found: C, 70.0; H, 4.5; N, 5.5.

EXAMPLE VIII

A mixture of 1.8621 g. (0.01 mole) 4,4'-dihydroxybiphenyl, 0.8 g. (1.5904 g. 50.3% aqueous solution, 0.02 mole) sodium hydroxide, 30 ml. dimethylsulfoxide, and 6 ml. benzene was stirred in a nitrogen atmosphere at reflux over a Dean-Stark trap for 3 hours and the benzene was distilled. The suspension was cooled to 40° C. and 5.4845 g. (0.01 mole) 4,4'-bis(3-nitrophthalimido) diphenylmethane and 30 ml. dry dimethylsulfoxide were added. After stirring at 40° C. for 30 minutes 2 ml. glacial acetic acid were added and the mixture was poured into methanol solution.

The product, which separated as a white powder, was filtered, washed with water and methanol and dried "in vacuo" at 110° C. to give 6.3 g. (98.4% yield) of polymer. I.V. (NMP, 0.1 N LiBr) 0.36; $T_g$ (no transitions); TGA (air) 400° C.

*Analysis.*—Calculated for $(C_{41}H_{24}N_2O_6)_n$: C, 76.9; H, 3.8; N, 4.4. Found: C, 75.2; H, 4.0; N, 4.9.

EXAMPLE IX

A mixture of 1.8621 g. (0.01 mole) 4,4'-dihydroxybiphenyl, 0.8 g. (1.5904 g. 50.3% aqueous solution, 0.02 mole) of sodium hydroxide, 30 ml. dimethylsulfoxide, and 6 ml. benzene was stirred in a nitrogen atmosphere at reflux over a Dean-Stark trap for 6 hours and the benzene was distilled. The stirred solution was cooled to 50° C. and 5.5042 g. (0.01 mole) 4,4'-bis(3-nitrophthalimido) diphenylether and 30 ml. dry dimethyl sulfoxide were added. After 50 minutes reaction at 50° C., the reaction was quenched by adding 2 ml. of glacial acetic acid and the mixture was poured into 600 ml. of methanol.

The product was isolated by filtration, washed with methanol and dried "in vacuo" at 110° C. to give 6.1 g. (95% yield) of off-white granules. The crude polymer was dissolved in NMP, filtered, precipitated in methanol, washed with methanol, and dried "in vacuo" to give 6.4 g. of tan powdery polymer. I.V. (NMP, 0.1 N LiBr) 0.6; $T_g$ (no transitions); TGA (air) 390° C.

*Analysis.*—Calculated for $(C_{40}H_{22}N_2O_7)_n$: C, 74.8; H, 3.4; N, 4.8. Found: C, 72.9; H, 3.5; N, 4.8.

EXAMPLE X

A mixture of 1.1011 g. (0.01 mole) hydroquinone, 0.8 g. (1.5904 g. of 50.3% aqueous solution, 0.02 mole) sodium hydroxide, 20 ml. dimethyl sulfoxide, and 6 ml. benzene was stirred in a nitrogen atmosphere at reflux over a Dean-Stark trap for 4 hours and the benzene was removed by distillation. The suspension of dianion in dimethylsulfoxide was cooled to 40° C. and stirred while 5.4042 g. (0.01 mole 4,4'-bis(3-nitrophthalimido) diphenylether and 30 ml. dimethylsulfoxide were added. After stirring for 20 minutes at 40° C. and 10 minutes at 60° C., the mixture was cooled and acidified with acetic acid.

The mixture was added to methanol and the product was isolated by filtration, washed with water and methanol and dried "in vacuo" at 110° C. to give 4.3 g. (76.0% yield) of light brown powder. The crude product was dissolved in o-cresol, reprecipitated in methanol, filtered and dried to give 4.2 g. of powdery polymer. I.V. (NMP, 0.1 N LiBr) 0.45; $T_g$ 237° C.; TGA (air) 430° C.

*Analysis.*—Calculated for $(C_{34}H_{18}N_2O_7)_n$: C, 72.1; H, 3.2; N, 4.9. Found: C, 69.8; H, 3.4; N, 5.9.

EXAMPLE XI

A mixture of 5.5784 g. (0.01 mole) tetrabromotetramethylbiphenol, 5.4845 g. (0.01 mole) 4,4'-bis(3-nitrophthalimido) diphenylmethane, 5.52 g. (0.04 mole) potassium carbonate, 0.5 g. dicyclohexylmethylamine, and 50 ml. dry dimethylformamide was stirred in a nitrogen atmosphere at 35–40° C. for 1 week.

The mixture was added to methanol and the precipitate was isolated by filtration, washed with methanol and water and dried "in vacuo" at 110° C. The crude product was dissolved in methylene chloride, filtered, and precipitated from methanol to give a gray powder. I.V. $(CH_2Cl_2)$ 0.14; $T_g$ (no transitions); TGA (air) 360° C.

*Analysis.*—Calculated for $(C_{45}H_{28}Br_4N_2O_6)_n$: C, 53.3; H, 2.8; N, 2.7. Found: C, 52.3; H, 2.9; N, 2.7.

EXAMPLE XII

A mixture of 2.2828 g. (0.01 mole) Bisphenol A, 0.8 g. (1.5904 g. 50.3% aqueous solution, 0.02 mole) sodium hydroxide, 20 ml. dimethylsulfoxide and 6 ml. benzene was stirred in a nitrogen atmosphere at reflux over a Dean-Stark trap for 5 hours and the benzene was distilled. The stirred solution was cooled to 35° C. and 5.5042 g. (0.01 mole) 4,4'-bis(4-nitrophthalimido) diphenylether and 35 ml. dry dimethylsulfoxide were added. The mixture was stired at 40° C. for 1 hour and 70° C. for 30 minutes at which time is was added to 600 ml. of methanol containing 10 ml. of glacial acetic acid.

The product was isolated by filtration, washed with methanol, and dried "in vacuo" at 110° C. to give 6.7 g. (98% yield) of off-white granular powder. The crude product was dissolved in methylenechloride solution, filtered, reprecipitated in methanol and dried to give a fine yellow granular solid. I.V. $(CH_2Cl_2)$ 0.23; $T_g$, 196° C.; TGA (air) 420° C.

*Analysis.*—Calculated for $(C_{43}H_{28}N_2O_7)_n$: C, 75.4; H, 4.1; N, 4.1. Found: C, 74.1; H, 4.1; N, 4.1.

EXAMPLE XIII

A mixture of 2.2828 g. (0.01 mole) of Bishphenol A, 0.8 g. (1.5904 g. of 50.3% aqueous solution, 0.02 mole) of sodium hydroxide, 20 ml. of dimethylsulfoxide, and 5 ml. of benzene was stirred in a nitrogen atmosphere at reflux over a Dean-Stark trap for 4 hours and the benzene was distilled. The mixture was cooled to 40° C. and stirred while 2.7521 g. (0.005 mole) each of 4,4'-bis(3-nitrophthalimido) diphenylether, and 4,4'-bis(4-nitrophthalimido) diphenylether, and 40 ml. dry dimethylsulfoxide were added. The mixture was stirred for 1 hour at room temperature, 2 minutes at 60° C., and then 30 additional minutes at room temperature.

After acidification with 1 ml. of glacial acetic acid, the reaction mixture was added to methanol, the product was isolated by filtration, washed with methanol, and dried "in vacuo" at 65–70° C. to give 6.84 g. (100% yield) of off-white granular powder. I.V. $(CH_2Cl_2)$ 0.17; $T_g$, 193° C.; TGA (air) 380° C.

*Analysis.*—Calculated for $(C_{43}H_{28}N_2O_7)_n$: C, 75.4; H, 4.1; N, 4.1. Found: C, 72.7; H, 4.3; N, 4.2.

EXAMPLE XIV

A mixture of 2.2828 g. (0.01 mole) Bisphenol A, 0.8 g. (1.5904 g. 50.3% aqueous solution, 0.02 mole) sodium hydroxide, 15 g. dimethylsulfoxide, and 8 ml. benzene was stirred in a nitrogen atmosphere at reflux over a Dean-Stark trap for 5 hours and the benzene was distilled. The mixture was cooled to 40° C. and 4.6640 g. (0.01 mole) 1,6-bis(3-nitrophthalimide)hexane and 55 ml. chlorobenzene were added. The mixture was stirred for 17 hours at room temperature, acidified by addition of 1 ml. glacial acetic acid, and then poured into 600 ml. of methanol.

The product was isolated by filtration, washed with methanol and water, and dried "in vacuo" at 110° C. to give 5.5 g. (91.6% yield) of off-white powder. The crude product was dissolved in methylene-chloride solution and reprecipitated in methanol to give a snow white granular polymer. I.V. $(CH_2Cl_2)$ 0.28.

EXAMPLE XV

The dianion of BPA was prepared in the normal fashion from 1.666 g. (7.306 mmol.) BPA, 1.162 g. (14.61 mmol., 50.3% aqueous solution) sodium hydroxide, 15 ml. DMSO and 25 ml. benzene. When all the water was removed by azeotropic distillation, benzene was distilled out of the reaction flask. A 4.018 g. (7.306 mmol.) portion of the mixed bisimides obtained from the reaction of one equivalent 4,4'-diamino diphenylether with one equivalent each or 3-nitro- and 4-nitrophthalic anhydride was added along with 25 ml. DMSO and the reaction mixture was heated at 55–60° C. with stirring for 4 hours.

After addition of 2 ml. acetic acid the polymer was precipitated in methanol, collected on a fiter, washed with methanol and dried overnight in a vacuum oven at 80° C., 15–20 mm. Yield 4.86 g. (98%). I.V. $(CH_2Cl_2)$ 0.21.

EXAMPLE XVI

The dianion of BPA was prepared in the usual manner from 1.578 g. 50.3% aqueous sodium hydroxide (19.85 mmol.) and 2.263 g. (9.93 mmol.) BPA in 25 ml. DMSO. Benzene, 25 ml., was added and water was removed by azeotropic distillation. When the system was competely anhydrous benzene was distilled out and the reaction flask was cooled to 55–60° C. A 4.685 g. (9.93 mmol.) portion of 2,4-bis(3-nitrophthalimido) toluene was added along with 20 ml. DMSO and the resulting solution was heated at 55–60° C. for 1.5 hours. After addition of 2 ml. acetic acid, the polymer was precipitated in a large volume of methanol, collected on a filter, washed with methanol and oven dried. Yield 5.53 g. (92%). I.V. (CH₂Cl₂) 0.17.

EXAMPLE XVII

A solution of the dianion was prepared from 1.455 g. (6.38 mmol.) BPA and 1.015 g. (2.76 mmol., 50.3% aqueous solution) sodium hydroxide in 10 ml. dimethyl sulfoxide. Benzene, 25 ml., was added and water was removed by azeotropic distillation. The system was maintained under a nitrogen atmosphere. When all the water was removed, benzene was distilled out and the reaction flask was allowed to cool to room temperature. A 3.497 g. portion of 4,4'-bis(3-nitrophthalimido) diphenylmethane along with 30 ml. of methylene chloride was added and the resulting suspension was stirred at room temperature for about 15 hours. Acetic acid (2 ml.) was added and the polymer was precipitated in a large volume of methanol as a white granular solid. Yield 4.1 g. (95%). I.V. (CH₂Cl₂) 0.20.

EXAMPLE XVIII

The dianion was prepared in the usual manner from 1.620 g. (7.105 mmol.) BPA and 1.130 g. (14.21 mmol., 50.3% aqueous solution) sodium hydroxide in 8 ml. dimethyl sulfoxide. Benzene, 25 ml., was added and water was removed by azeotropic distillation. The system was maintained in a nitrogen atmosphere. When all the water was removed, benzene was distilled out and the reaction flask allowed to cool to room temperature. A 3.894 g. (7.105 mmol.) portion of 4,4'-bis(3-nitrophthalimido) diphenylmethane was added along with 32 ml. chlorobenzene. The reaction mixture was stirred overnight at 50° C. to give a viscous solution.

An initial dark red color became lighter as reaction proceeded. After addition of 2 ml. acetic acid, the polymer was precipitated in a large volume of methanol. The fluffy white polymer was collected on a filter, washed with methanol and dried overnight in a vacuum oven at 80°/15–20 mm. Yield 5.00 g. (103%). I.V. (CH₂Cl₂) 0.28.

While we have described hereinabove the terminal groups as being nitro-substituted aromatic groups or hydroxyphenyl groups (phenolic groups), we may further designate the terminal groups by the symbols Q and Q'. Accordingly, Q is derived from the nitro-containing aromatic compound and may be —NO₂ attached to the aromatic ring or the residue of the nitro-containing compound (as illustrated by the compound of formula III in which attachment to the polymer occurs through one of the —NO₂ groups); whereas Q' is derived from the dihydroxy aromatic compound and may be —OH attached to the aromatic ring or the residue of the dihydroxy aromatic compound (formed by acidification of the compound of formula IV, in which attachment to the polymer occurs through one of the oxygen atoms).

It will be appreciated that the invention is not limited to the specific details shown in the examples and illustrations and that various modifications may be made within the ordinary skill in the art without departing from the spirit and scope of the invention.

We claim:

1. A polyetherimide consisting essentially of chemically combined units of the formula

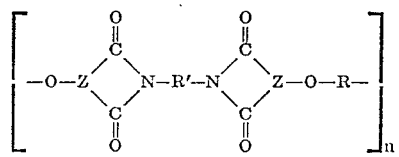

where n is an integer having a value greater than 1, R is a divalent carbocyclic aromatic radical having from 6–20 carbon atoms, R' is a divalent organic radical selected from the group consisting of phenylene, lower alkylphenylene,

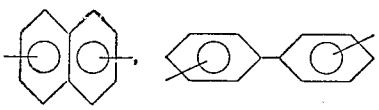

xylylene, C₍₂₋₂₀₎ alkylene, cycloalkylene, and

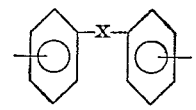

X is a member selected from the group consisting of bivalent aliphatic, cycloaliphatic, and araliphatic radicals having 1–8 carbon atoms, $$-O-,\ -\overset{O}{\underset{}{C}}-,\ -S-,\ \text{and}\ -\overset{O}{\underset{O}{S}}-,$$

OZ is a member selected from the group consisting of (a) 

where R" is selected from the group consisting of hydrogen, lower alkyl and lower alkoxy, (b) 

and (c) 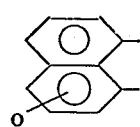

where the oxygen can be attached to either ring and located ortho or para to one of the bonds to the anhydride carbonyl groups, said polyetherimide being terminated by the nitro-substituted aromatic group >Z—NO₂ or a phenolic group.

2. The polyetherimide of claim 1 where R is a member selected from the group consisting of phenylene, lower alkylphenylene,

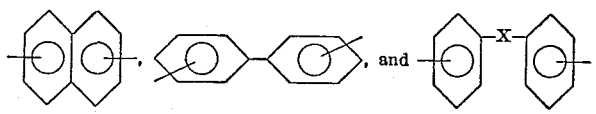

X is a member selected from the group consisting of bivalent aliphatic radicals, cycloaliphatic radicals or araliphatic radicals having 1–8 carbon atoms, $$-O-,\ -\overset{O}{\underset{}{C}}-,\ -S-,\ \text{and}\ -\overset{O}{\underset{O}{S}}-$$

R' is a member selected from the group consisting of R, xylylene, C₍₂₋₂₀₎ alkylene, cycloalkylene, bis(4-cycloalkyl) lower alkylene, and alkylcycloalkylene, and n is an integer having a value of 2–5,000.

3. A polyetherimide in accordance with claim 1 consisting essentially of chemically combined units of the formula,

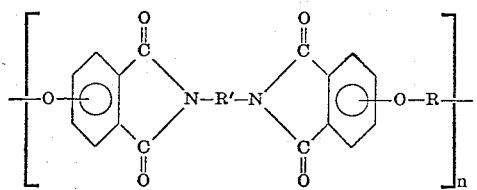

where R, R' and $n$ are as previously defined.

4. The polyetherimide of claim 3, where R is a member selected from the group consisting of phenylene, lower alkylphenylene,

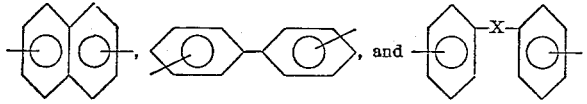

X is a member selected from the group consisting of bivalent aliphatic radicals, cycloaliphatic radicals, or araliphatic radicals having 1–8 carbon atoms,

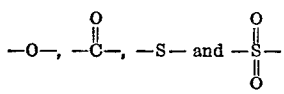

R' is a member selected from the group consisting of R, xylylene, $C_{(2-20)}$ alkylene, cycloalkylene, bis(4-cycloalkyl) lower alkylene, and alkylcycloalkylene, and $n$ is an integer having a value of 2–5,000.

5. The polyetherimide of claim 4, where the compound consists essentially of the formula:

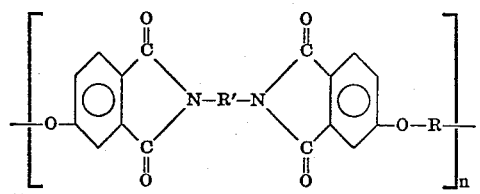

wherein R, R', and $n$ are defined hereinabove.

6. The polyetherimide of claim 5, where R is

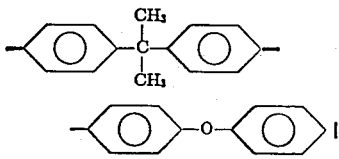

and R' is

7. The polyetherimide of claim 5, where R is

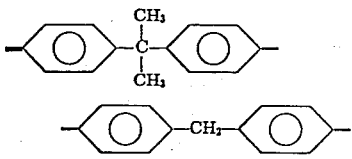

and R' is

8. The polyetherimide of claim 4, where the compound is represented by the formula:

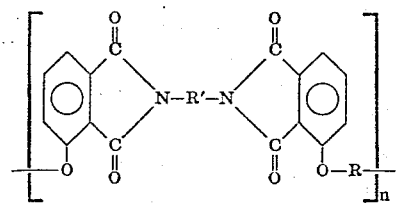

wherein R, R', and $n$ are defined hereinabove.

9. The polyetherimide of claim 8, where R is

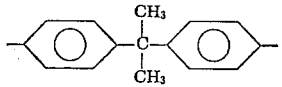

and R' is alkylene containing 2–20 carbon atoms.

10. The polyetherimide of claim 8, where R is

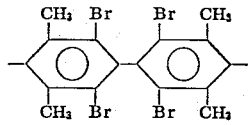

and R' is m-phenylene.

11. The polyetherimide of claim 8, where R is

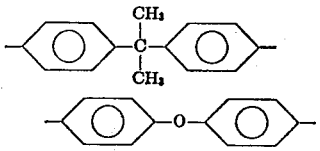

and R' is

12. The polyetherimide of claim 8, where R is

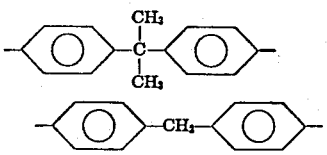

and R' is

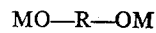

13. A method for making a polyetherimide comprising effecting reaction at a temperature in the range of between 25°–150° C. in the presence of a dipolar aprotic solvent free of active protons capable of interfering with the reaction of a mixture of ingredients comprising substantially equal molar amounts of (1) a salt of an organic compound in the general formula,

MO—R—OM where M is an alkali metal and R is a divalent carbocyclic aromatic radical containing from 6 to 20 carbon atoms, and (2) a dinitro-substituted aromatic compound of the general formula

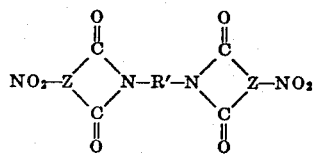

where R' is a divalent organic radical selected from the group consisting of phenylene, lower alkylphenylene,

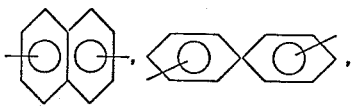

xylylene, $C_{(2-20)}$ alkylene, cycloalkylene, and

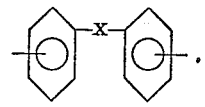

where X is a member selected from the group consisting of bivalent aliphatic, cycloaliphatic, and araliphatic radicals having 1–8 carbon atoms,

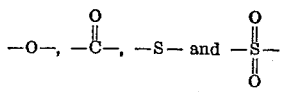

and NO₂—Z< is defined as a member selected from the group consisting of (a) 

where R" is selected from the group consisting of hydrogen, lower alkyl or lower alkoxy, (b) 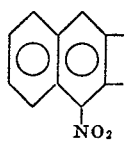

and (c) 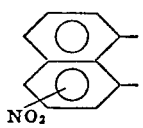

and where the NO₂ group can be attached to either ring and located ortho or para to one of the bonds to the anhydride carbonyl groups.

14. The method of claim 13, wherein R is a member selected from the group consisting of phenylene, lower alkylphenylene,

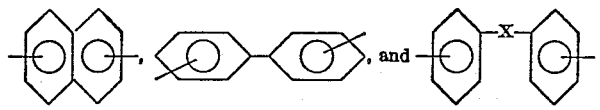

where in X is a member selected from the group consisting of bivalent aliphatic radicals, cycloaliphatic radicals, or aralkyphatic radicals having 1–8 carbon atoms,

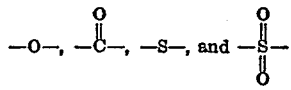

15. A method of making a polyetherimide comprising effecting reaction at a temperature in the range of from 25°–150° C. in the presence of a dipolar aprotic solvent free of active hydrogen capable of interfering with the reaction of a mixture of ingredients comprising substantially equal molar amounts of (1) a salt of an organic compound of the general formula:

MO—R—OM where M is an alkali metal and R is a divalent carbocyclic aromatic radical containing from 6 to 20 carbon atoms; and (2) a dinitro-substituted aromatic compound of the general formula:

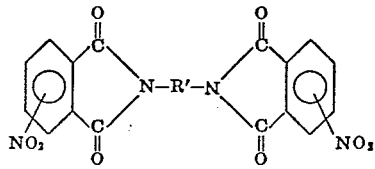

where R' is a divalent organic radical selected from the group consisting of phenylene, lower alkylphenylene,

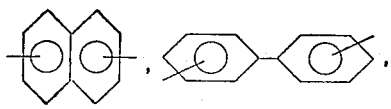

xylylene, C$_{(2-20)}$ alkylene, cycloalkylene, and

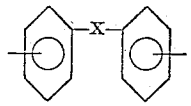

where X is a member selected from the group consisting of bivalent aliphatic, cycloaliphatic, and aralkyphatic having 1–8 carbon atoms,

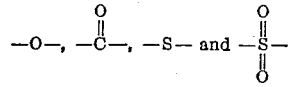

16. The method of claim 15, where R is a member selected from the group consisting of phenylene, lower alkylphenylene,

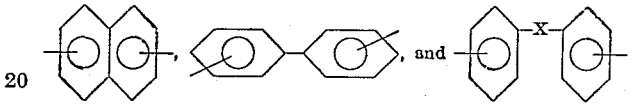

where X is a member selected from the group consisting of bivalent aliphatic radicals, cycloaliphatic radicals, or aralkyphatic radicals having 1–8 carbon atoms,

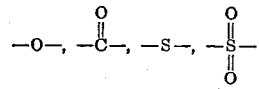

and R' is a member selected from the group consisting of R, xylylene, alkylene containing from 2–20 carbon atoms, cycloalkylene, bis(4-cycloalkyl) lower alkylene, and alkylcycloalkylene.

17. The method of claim 15, wherein the dinitro-substituted aromatic compound has the general formula:

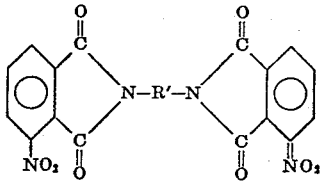

18. The method of claim 15, wherein the dinitro-substituted aromatic compound has the general formula:

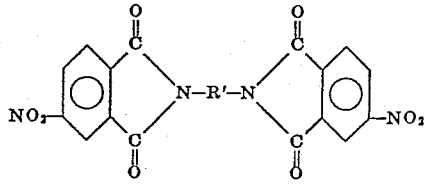

19. The method of claim 15, wherein said dipolar aprotic solvent is a member selected from the group consisting of N,N-dimethylacetamide, N-methylpyrrolidone, N,N-dimethylformamide, dimethylsulfoxide, hexamethylphosphoramide, N,N-diethylformamide, N,N-diethylacetamide, and tetramethylene sulfone.

20. The method of claim 19, wherein said solvent is dimethylsulfoxide.

21. The method of claim 19, wherein said dipolar aprotic solvent is mixed with an inert organic cosolvent selected from the group consisting of benzene, toluene, xylene, chlorobenzene, and methylene chloride.

22. The method of claim 16, wherein the polymerization reaction is effetced under anhydrous conditions in an inert atmosphere, for a time and at a temperature sufficient to provide said polyetherimide.

23. The method of claim 22, wherein said time is about 5 minutes to 40 hours and said temperature is about 25°–150° C.

24. The method of claim 15, wherein said salt of an organic compound of the general formula: MO—R—OM is formed in situ by adding an alkali metal carbonate and the dihydroxy compound corresponding to the divalent carbocyclic aromatic radical directly to the nitro-substituted aromatic compound in the presence of the dipolar aprotic solvent.

25. The method of claim 24, wherein said alkali metal carbonate is potassium carbonate.

26. The method of claim 22, wherein M is sodium, R is

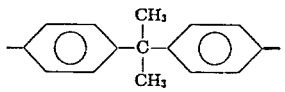

and the dinitro-substituted aromatic compound is

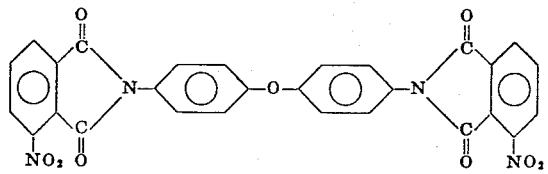

27. The method of claim 22, wherein M is sodium, R is

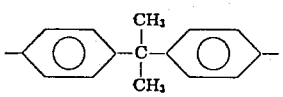

and the dinitro-substituted aromatic compound is

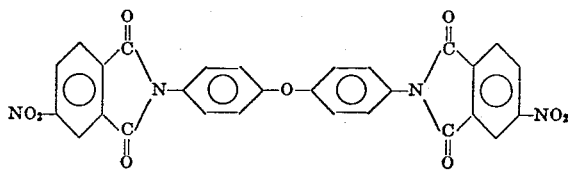

28. The method of claim 22, wherein M is sodium, R is

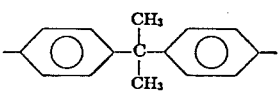

and the dinitro-substituted aromatic compound is

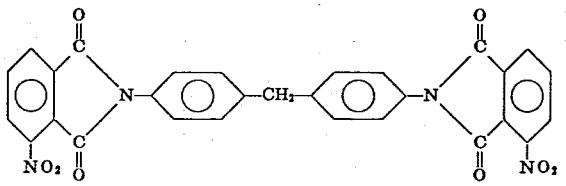

29. The method of claim 22, where M is sodium, R is

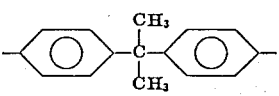

and the dinitro-substituted aromatic compound is

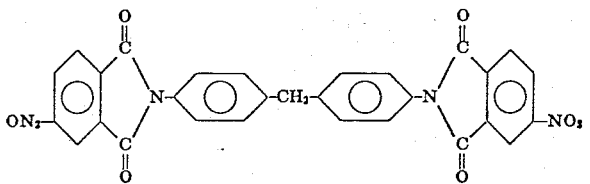

30. A polyetherimide consisting essentially of from about 2 to about 5000 chemically combined units of the formula

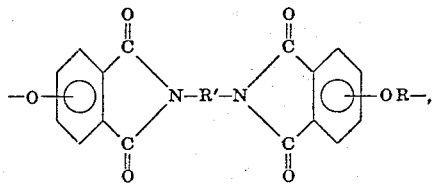

where R is

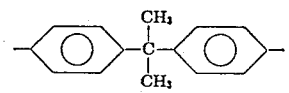

and R' is a divalent organic radical selected from the group consisting of phenylene, lower alkylphenylene,

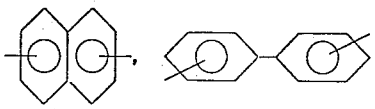

xylylene, $C_{(2-20)}$ alkylene, cycloalkylene, and

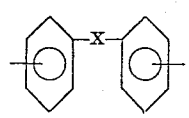

where X is a member selected from the group consisting of bivalent aliphatic, and araliphatic radicals having 1–8 carbon atoms,

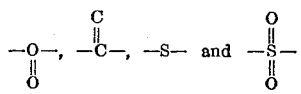

31. A polyetherimide in accordance with claim 30 consisting essentially of chemically combined units of the formula

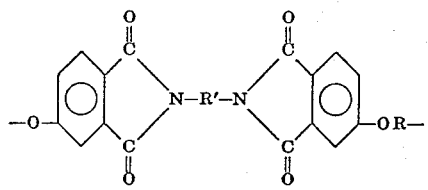

where R and $R^1$ are as previously defined.

32. A polyetherimide in accordance with claim 30, consisting essentially of chemically combined units of the formula

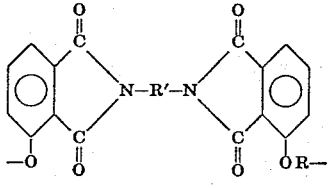

where R and R' are as previously defined.

33. A polyetherimide in accordance with claim 30 consisting essentially of chemically combined units of the formulas.

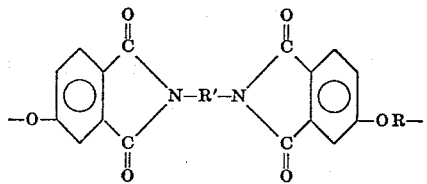

and

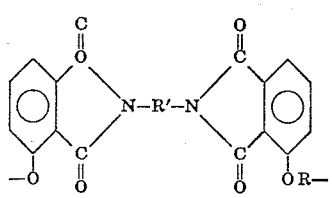

where R and R' are as previously defined.

34. A polyetherimide in accordance with claim 32, consisting essentially of chemically combined units of the formulas

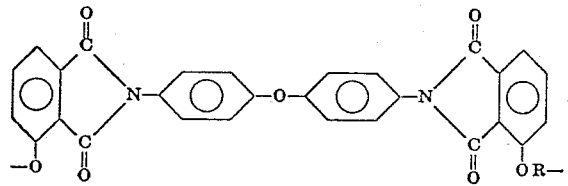

and

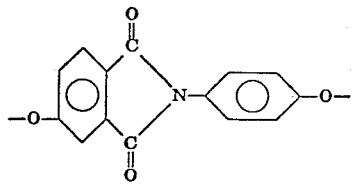

where R is as previously defined.

35. A polyetherimide in accordance with claim 31, consisting essentially of chemically combined units of the formula,

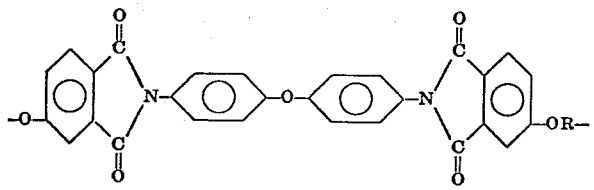

where R is

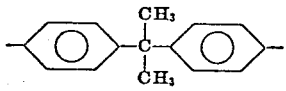

36. A polyetherimide in accordance with claim 31, consisting essentially of chemically combined units of the formula

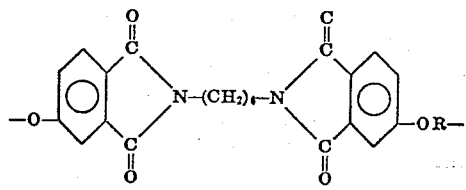

where R is

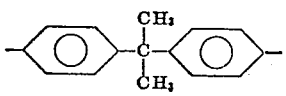

37. A polyetherimide in accordance with claim 31, consisting essentially of chemically combined units of the formula

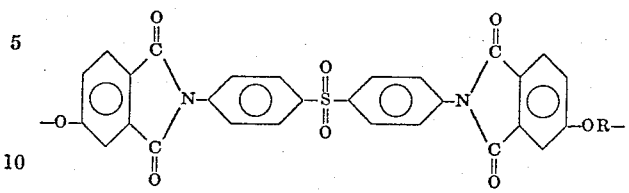

where R is

38. A polyetherimide in accordance with claim 30, consisting essentially of chemically combined units of the formula

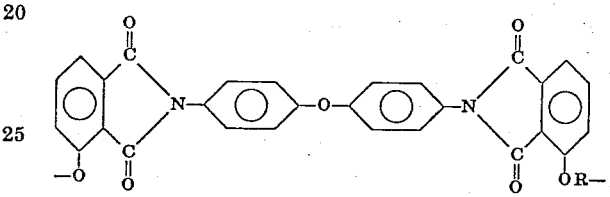

where R is as previously defined.

39. A polyetherimide in accordance with claim 30 consisting essentially of chemically combined units of the formula

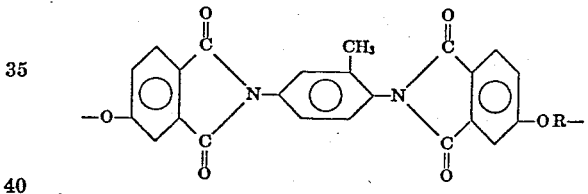

where R is as previously defined.

References Cited

UNITED STATES PATENTS

| | | | |
|---|---|---|---|
| 3,567,685 | 3/1971 | Bialous et al. | 260—47 |
| 3,652,710 | 3/1972 | Holub et al. | 260—823 |

FOREIGN PATENTS

| | | | |
|---|---|---|---|
| 257,010 | 11/1969 | U.S.S.R. | 260—47 CP |
| 324,656 | 8/1968 | U.S.S.R. | 260—47 CP |

OTHER REFERENCES

Laius et al., "Kinetics of Formation of Polyimides," C. A., Vol. 76, 1972, pp. 6–7.

Borisova et al., "Relaxation Properties of Polyimides Studied by Dielectric and Mechanical Methods," C. A., Vol. 76, 1972, p. 9.

LESTER L. LEE, Primary Examiner

U.S. Cl. X.R.

260—30.2, 30.6 R, 30.8 DS, 32.6 N, 47 CZ, 47 CP

Disclaimer 3,838,097.—*Joseph G. Wirth* and *Darrell R. Heath*, Schenectady, N.Y. PROCESS FOR MAKING POLYETHERIMIDES AND PRODUCTS DERIVED THEREFROM. Patent dated Sept. 24, 1974. Disclaimer filed Nov. 1, 1974, by the assignee, *General Electric Company*.

Hereby enters this disclaimer to claims 30–39 of said patent.

[*Official Gazette June 24, 1975.*]